United States Patent
Buck et al.

(10) Patent No.: US 12,201,998 B2
(45) Date of Patent: Jan. 21, 2025

(54) BELL PLATE, ATOMIZER-TYPE CLEANING DEVICE, AND ASSOCIATED OPERATING METHOD

(71) Applicant: Dürr Systems AG, Bietigheim-Bissingen (DE)

(72) Inventors: Thomas Buck, Sachsenheim (DE); Kevin Preuss, Mühlacker (DE); Michael Baumann, Flein (DE); Frank Herre, Oberriexingen (DE); Bernhard Seiz, Lauffen (DE); Hans-Jürgen Nolte, Besigheim (DE); Daniel Luz, Stuttgart (DE)

(73) Assignee: Dürr Systems AG, Bietigheim-Bissingen (DE)

( * ) Notice: Subject to any disclaimer, the term of this patent is extended or adjusted under 35 U.S.C. 154(b) by 380 days.

(21) Appl. No.: 17/441,343

(22) PCT Filed: Mar. 2, 2020

(86) PCT No.: PCT/EP2020/055384
§ 371 (c)(1),
(2) Date: Sep. 21, 2021

(87) PCT Pub. No.: WO2020/193080
PCT Pub. Date: Oct. 1, 2020

(65) Prior Publication Data
US 2022/0161290 A1   May 26, 2022

(30) Foreign Application Priority Data
Mar. 27, 2019   (DE) ...................... 10 2019 107 847.4

(51) Int. Cl.
*B05B 15/55*   (2018.01)
*B05B 3/10*   (2006.01)
(Continued)

(52) U.S. Cl.
CPC .......... *B05B 15/555* (2018.02); *B05B 3/1042* (2013.01); *B25J 11/008* (2013.01); *B05B 5/0407* (2013.01)

(58) Field of Classification Search
USPC ..... 118/321, 323; 239/223, 224, 231, 225.1, 239/222.11, 237, 240, 382, 461
See application file for complete search history.

(56) References Cited

U.S. PATENT DOCUMENTS

| | | | |
|---|---|---|---|
| 6,189,804 B1 | 2/2001 | Vetter et al. | |
| 6,360,962 B2 | 3/2002 | Vetter et al. | |

(Continued)

FOREIGN PATENT DOCUMENTS

| | | | | |
|---|---|---|---|---|
| CN | 101959608 A | * | 1/2011 | .......... B05B 3/1042 |
| DE | 10110098 A1 | | 9/2002 | |

(Continued)

OTHER PUBLICATIONS

English Translation WO-2018020755 (Year: 2018).*

(Continued)

*Primary Examiner* — Yewebdar T Tadesse
(74) *Attorney, Agent, or Firm* — Taft Stettinius & Hollister LLP; Thomas E. Bejin; John Wray Carpenter

(57) ABSTRACT

The disclosure relates to a bell plate for a rotary atomizer for applying a coating agent (e.g. paint) to a component (e.g. motor vehicle body component). The bell plate according to the disclosure comprises a metallic base body and a transponder which can be read out wirelessly and is integrated in the bell plate. The disclosure provides that the transponder is arranged on the front side in the base body or is embedded in the outer outer circumferential surface of the bell plate, which facilitates the read-out of the transponder. Furthermore, the disclosure comprises a suitably adapted atomizer cleaning device having an antenna for reading out the (Continued)

transponder in the bell plate. Finally, the disclosure also comprises a correspondingly adapted operating method.

19 Claims, 13 Drawing Sheets

(51) Int. Cl.
  *B05B 15/555* (2018.01)
  *B25J 11/00* (2006.01)
  *B05B 5/04* (2006.01)

(56) References Cited

U.S. PATENT DOCUMENTS

| | | |
|---|---|---|
| 6,623,561 B2 | 9/2003 | Vetter et al. |
| 7,017,835 B2 | 3/2006 | Vetter et al. |
| 8,141,797 B2 | 3/2012 | Vetter et al. |
| 8,590,813 B2 | 11/2013 | Vetter |
| 9,061,507 B2 | 6/2015 | Slomianny et al. |
| 10,426,253 B2 | 10/2019 | Baumann et al. |
| 10,434,534 B2 | 10/2019 | Kraft et al. |
| 10,773,265 B2 | 9/2020 | Seiz et al. |
| 2001/0001946 A1 | 5/2001 | Vetter et al. |
| 2001/0015384 A1 | 8/2001 | Vetter et al. |
| 2004/0000604 A1 | 1/2004 | Vetter et al. |
| 2006/0138250 A1 | 6/2006 | Vetter et al. |
| 2012/0160931 A1 | 6/2012 | Vetter et al. |
| 2015/0015644 A1 | 1/2015 | Slomianny et al. |
| 2016/0121372 A1 | 5/2016 | Pfau et al. |
| 2017/0072421 A1 | 3/2017 | Baumann et al. |
| 2017/0259290 A1 | 9/2017 | Kraft et al. |
| 2018/0280999 A1 | 10/2018 | Seiz et al. |
| 2019/0160479 A1 | 5/2019 | Yamauchi et al. |
| 2019/0265127 A1 | 8/2019 | Kitagawa et al. |
| 2020/0018548 A1* | 1/2020 | Lübbers ............... B05B 12/004 |

FOREIGN PATENT DOCUMENTS

| | | |
|---|---|---|
| DE | 102014006647 A1 | 11/2015 |
| DE | 102014017895 A1 | 6/2016 |
| DE | 102015000709 A1 | 7/2016 |
| EP | 0951942 A2 | 10/1999 |
| EP | 2868622 A1 | 5/2015 |
| EP | 3017875 A1 | 5/2016 |
| EP | 3320981 A1 | 5/2018 |
| WO | 2013120702 A1 | 8/2013 |
| WO | 2018020755 A1 | 2/2018 |
| WO | 2018020832 A1 | 2/2018 |

OTHER PUBLICATIONS

English Translation WO-2013120702A1 (Year: 2013).*
English Translation CN-101959608A (Year: 2011).*
International Search Report and Written Opinion for PCT/EP2020-055384 mailed Jul. 1, 2020 (13 pages; with English translation).
Office Action from German Patent Office for Application No. DE 10 2019 107 847.4 mailed Nov. 20, 2019 (7 pages; with English machine translation).

* cited by examiner

BELL PLATE, ATOMIZER-TYPE CLEANING DEVICE, AND ASSOCIATED OPERATING METHOD

CROSS-REFERENCE TO RELATED APPLICATIONS

This application is a national stage of, and claims priority to, Patent Cooperation Treaty Application No. PCT/EP2020/055384, filed on Mar. 2, 2020, which application claims priority to German Application No. 10 2019 107 847.4, filed on Mar. 27, 2019, which applications are hereby incorporated herein by reference in their entireties.

The disclosure relates to a bell plate for a rotary atomizer for the application of a coating agent, in particular for painting motor vehicle body components in a painting installation. Furthermore, the disclosure relates to a rotary atomizer with such a bell plate according to the disclosure and a painting robot with a rotary atomizer according to the disclosure. Furthermore, the disclosure comprises a correspondingly adapted atomizer cleaning device and a corresponding operating method.

BACKGROUND

In modern painting installations for painting motor vehicle body components, rotary atomizers are usually used for painting, which have a rotary disc that rotates during operation and atomizes the paint.

From WO 2018/020755 A1 it is known to equip such bell plates with a transponder that can be read wirelessly and contains an identification code. This makes it possible to identify the bell plates used in a painting installation by wirelessly reading the transponders integrated in the bell plates. The transponder is located on the back of the bell plate in the area of the mounting shaft of the bell plate. In operation, however, it has been shown that reading out the transponder may be difficult with this design.

With regard to the technical background of the disclosure, reference should also be made to DE 10 2014 017 895 A1, DE 10 2015 000 709 A1, EP 3 320 981 A1 and DE 10 2014 006 647 A1.

The disclosure is therefore based on the task of creating a correspondingly improved bell plate. Furthermore, the disclosure is based on the task of creating a correspondingly adapted, optimized readout facility. Finally, the disclosure is also based on the task of specifying a corresponding operating method.

DETAILED DESCRIPTION

Figure 1A:
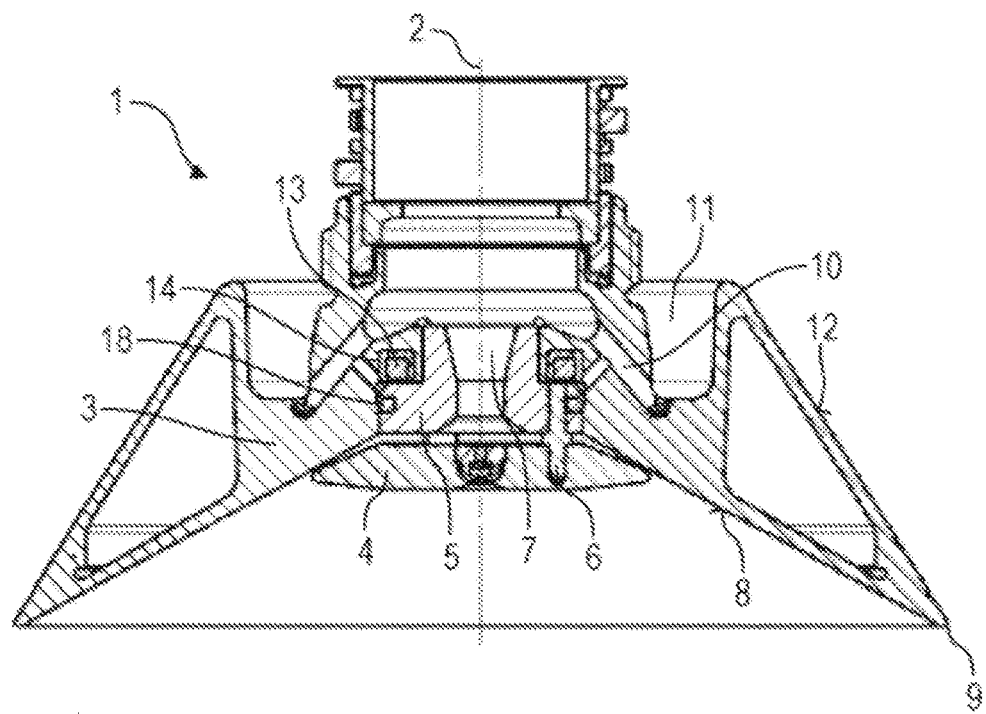
FIG. 1A a cross-sectional view of a bell plate according to the disclosure with an integrated transponder, FIG. 1B an enlargement of FIG. 1A in the area of the transponder, FIG. 2A a schematic representation of a transponder according to the disclosure, which is embedded in a plastic ring, FIG. 2B a cross-sectional view of the transponder according to FIG. 2A, FIG. 3 a perspective view of an atomizer cleaning device according to the disclosure with an integrated antenna for reading the transponder, FIG. 4 a top view of a painting installation according to the disclosure, FIG. 5 an exploded view of a rotary atomizer according to the disclosure with numerous transponders in the various components, FIG. 6 a perspective view of a robot arm of a painting robot with numerous components provided with transponders, FIGS. 7-10 flowcharts illustrating different variants of the operating method according to the disclosure, FIGS. 11-14 various variations of the embodiment according to FIG. 1A, FIGS. 15-17 different variations of the embodiment according to FIG. 2A.

The disclosure is based on the technical-physical realization that the reading of the transponder in the bell plate according to WO 2018/020755 A1 described at the beginning is hindered by the fact that the metallic base body of the bell plate forms an electromagnetic shield for the transponder attached to the rear side of the bell plate. The disclosure therefore firstly provides that the transponder is arranged in or on the front side of the base body of the bell plate, so that the metallic material of the base body does not form an electromagnetic shield, since it is located behind the transponder. The transponder can therefore be reliably read by a transponder reader from the front side of the bell plate, since there are no metallic components between the transponder reader and the transponder that could form an electromagnetic shield.

Alternatively, within the scope of the disclosure, it is possible for the transponder to be embedded in the outer surface of the bell plate.

It should be mentioned here that the term bell plate used in the context of the disclosure is to be understood in a general sense and includes both bell plates in the narrower sense and the disc-shaped spray bodies of so-called disc atomizers.

In an example of the disclosure, the base body of the bell plate has an axially extending central bore in order to be able to accommodate a paint nozzle for axial supply of the coating agent to be applied. In addition, the bell plate preferably has an annular, circumferential spray-off edge on the front side, at which the coating agent is atomized and sprayed off. The coating agent to be applied passes from the paint nozzle in the central bore of the base body via a frontal overflow surface on the base body to the outer spray-off edge, where it is sprayed off. In addition, the bell plate preferably has a distributor disc which deflects the axially and centrally supplied coating agent at least partially radially outward onto the overflow surface and to the spray-off edge of the bell plate, which is in itself known from the prior art. Preferably, this distributor disc is mounted on a distributor disc receptacle which is fixed in the base body. For example, this fastening of the distributor disc to the distributor disc receptacle can be effected by several axially extending bolts, as is known per se from the prior art.

In this known design of the bell plate, the distributor disc and/or the distributor disc receptacle preferably cover the transponder on the front side in order to protect the transponder from contamination by the coating agent. However, the transponder is preferably not arranged directly under the distributor disc, but lies in the groove of the bell plate and is encapsulated in plastic or surrounded by a separate plastic ring. However, this covering of the transponder by the distributor disc and/or the distributor disc receptacle preferably does not cause any electromagnetic shielding, since the distributor disc and/or the distributor disc receptacle is preferably made of plastic, so that the readout process is not impeded by the distributor disc or the distributor disc receptacle.

For accommodating the transponder in the bell plate, there is preferably a frontal annular space in the base body of the bell plate, which is preferably formed as an annular groove, the transponder being arranged in this annular space.

The transponder itself preferably has at least one antenna, which is preferably arranged in the annular space in the base body of the bell plate.

The at least one antenna can, for example, be closed in a ring or form an open ring.

Alternatively, it is possible that the antenna is designed as a dipole with one or two legs. Furthermore, the antenna can also have several circular segments, be rectilinear or meander-shaped. Furthermore, it should be mentioned that the antenna can work inductively or with electromagnetic waves.

With regard to the structural design of the transponder and the mounting in the bell plate, various possibilities exist within the scope of the disclosure, of which two variants are described below.

In a first variant, the transponder with its ring-shaped antenna is embedded, in particular cast, in a plastic ring. This plastic ring is then inserted, in particular pressed, into the annular space (e.g. annular groove) of the base body. It should be mentioned here that the plastic ring with the embedded transponder is preferably balanced with respect to its axis of symmetry, the axis of symmetry of the plastic ring preferably running coaxially with the axis of rotation of the bell plate. This is important in view of the high rotational speeds of the bell plate occurring during operation, so that the transponder does not cause any unbalance.

In another variant of the disclosure, the annular antenna of the transponder is inserted into the annular groove in the base body of the bell plate, preferably with a washer located at least partially between the groove bottom of the annular groove and the annular antenna of the transponder. A washer is not required, in particular, if the annular groove is completely encapsulated with plastic. The annular antenna is then encapsulated in the annular groove with a casting compound together with the washer, whereby the casting compound is non-metallic in order not to electromagnetically shield the transponder inserted in the annular groove. In this variant of the disclosure, the bell plate with the transponder encapsulated therein is then balanced, as is known per se from the prior art.

With regard to this disclosure variant, the washer is preferably essentially L-shaped in cross-section, a first leg of the washer, which is L-shaped in cross-section, preferably extending radially and being located between the annular antenna of the transponder and the groove bottom of the annular groove, while a second leg of the washer, which is L-shaped in cross-section, preferably extends axially and is located between the annular antenna and a radially inner groove flank of the annular groove.

Further antennas can be integrated in the distributor disc, which significantly increase the read/write range by coupling with the transponder and its antenna.

The distributor disc receptacle may cover the transponder on the front face to prevent contamination of the transponder. In this case, it is possible for the distributor disc receptacle to seal the annular groove in the base body that is open at the front face. For this purpose, an additional sealing ring can be provided, which is arranged in an annular sealing groove in the distributor disc receptacle and lies sealingly against the base body of the bell plate. The transponder is preferably encapsulated in plastic and the distributor disc does not necessarily seal the transponder.

The annular space (e.g. annular groove) in the base body of the bell plate preferably runs coaxially with the axis of rotation of the bell plate. This is advantageous because it largely prevents imbalance of the bell plate.

Furthermore, the annular groove may be exactly circular. However, there is also the possibility that the annular groove may not have an exact circular ring shape and be coaxial with the axis of rotation. Rather, there is also the possibility that the annular groove has deviations from the ideal annular shape and/or from the exact coaxial alignment, which can be used to balance the bell plate.

Regarding the transponder it can optionally be an active transponder with its own power supply or a passive transponder without its own power supply. Preferably, the transponder is an RFID transponder (RFID: Radio-Frequency Identification), which outputs an identification code when interrogated, whereby the identification code preferably identifies the bell plate.

Furthermore the transponder can optionally be a read-only transponder or a read-write transponder. In the case of a read-only transponder, the transponder can only be read, i.e. it is not possible to change the stored data content of the transponder wirelessly. With a read-write transponder, on the other hand, it is possible to read out the stored data content wirelessly and to change it wirelessly.

It is also possible for the transponder to operate at two different communication frequencies, for example in the UHF range (UHF: Ultra-high-frequency, i.e. in the frequency range 300 MHz-3 GHz, preferably 860-920 MHz) on the one hand and in the NFC frequency range (NFC: Near Field Communication) on the other (e.g. at 13.56 MHz).

For this purpose, the transponder can have two chips, each with its own antenna. This can also be advantageous regardless of the communication frequency, since the chips can then contain independent information.

However, the disclosure does not only claim protection for the above-described bell plate as a single component. Rather, the disclosure also claims protection for a complete rotary atomizer with such a bell plate according to the disclosure. As is known, such rotary atomizers have numerous other components which can also be provided with their own transponder. Thus, in addition to the bell plate, the following further rotary atomizer components can partially or all have their own trans-ponder:

Shaping air ring for emitting a shaping air jet onto the spray jet of the coating agent,
turbine for driving the rotary atomizer,
paint tube,
main needle valve controlling the coating agent delivery,
housing of the rotary atomizer,
connecting flange of the rotary atomizer,
valve block in the rotary atomizer,
valves.

Furthermore, the disclosure also claims protection for a complete painting robot with such a rotary atomizer, which contains at least one transponder. In such painting robots, as is known, there are further components which can also be partially or completely provided with a transponder, such as paint pressure regulator, metering pump, valve block, valves, color changer.

The arrangement of the transponder on the face of the bell platen enables—as already briefly mentioned above—the transponder to be read from the front side of the bell platen. For this purpose, the transponder reader can be integrated into an atomizer cleaning device, since the rotary atomizer is inserted axially into the atomizer cleaning device during a cleaning process, which allows the transponder to be read/written during the insertion process. The atomizer cleaning device according to the disclosure therefore has an integrated antenna of a transponder read/write device in order to be able to write/read the transponder of the rotary atomizer to be cleaned when the rotary atomizer is inserted into the atomizer cleaning device.

Preferably, the antenna of the transponder reader may be ring-shaped, in particular circular ring-shaped, in order to be able to generate a rotating detection field.

Atomizer cleaning devices are basically known from the prior art and therefore need not be described in detail. It is only to be mentioned here that the atomizer cleaning device preferably has an insertion opening in order to be able to insert the rotary atomizer to be cleaned through the insertion opening into the atomizer cleaning device. In the atomizer cleaning device, the rotary atomizer is then cleaned by spraying with cleaning liquid and/or by brushing. The annular antenna of the transponder reader thereby surrounds the insertion opening of the atomizer cleaning device preferably annularly and preferably also coaxially.

Furthermore, the atomizer cleaning device according to the disclosure preferably has a cover in which the insertion opening is located. Here, the antenna of the transponder read/write device can be arranged on the cover, for example on the inside of the cover or embedded in the cover.

It has already been briefly mentioned above that the disclosure also pursues a corresponding operating method for a painting installation. In the context of this operating method according to the disclosure, a writing/reading of the transponder at the bell plate, rotary atomizer or painting robot takes place, which is known in itself from the prior art. The operating method according to the disclosure is characterized by the fact that the painting robot positions the rotary atomizer for writing/reading the transponder in a cleaning station or also in front of a write/read point, which is not located in the area of the cleaning device, in or on an atomizer cleaning device, so that the transponder can then be read out. The transponder is therefore preferably written/read during a cleaning process that is necessary anyway, so that the cycle time of the painting installation does not have to be extended by the transponder writing/reading process.

During the normal painting process, the transponder does not normally have to be read out, since it is not possible to change the bell plate during the normal painting process. For example, the painting robots are usually operated in painting booths that have an access protection system that prevents access to the painting booth by persons when activated and only allows access to the painting booth by persons when deactivated. However, if the access protection system of the paint booth is deactivated, there is a possibility that persons may enter the paint booth and replace the bell plate. It therefore makes sense, when the access protection system is deactivated, for the transponder to be written to/read out in order to identify the bell plate or the other components provided with a transponder. This readout process preferably takes place after the access protection system has been reactivated.

Furthermore, it should be mentioned that the painting installation can usually be operated in different modes (operating modes), namely in an automatic mode, a cleaning mode or a maintenance mode. In the automatic mode, the painting robot operates automatically and program-controlled and paints components in the painting booth, for example motor vehicle body components. In the cleaning mode, on the other hand, the rotary atomizer is cleaned, as described briefly above. In the maintenance mode, on the other hand, maintenance of the painting installation is possible. In addition, the painting installation may have a manual operation mode in which manual operation is performed. When changing the mode (operating mode), it is useful to read out the transponder. This applies in particular to a change from cleaning/maintenance/manual mode to automatic mode.

It has already been mentioned above that in the automatic mode of the painting installation there is usually no need for a readout process, since no components can be changed during the automatic mode. However, during the automatic mode it is preferably checked whether one of the following trigger events occurs:

Activation of an emergency stop, in particular by manual actuation of an emergency stop switch,
detection of a person entering the paint booth,
deactivation of the access protection system.

The transponder is then preferably written/read out if one of the aforementioned trigger events has been detected in the automatic mode. However, this write/read process does not have to take place immediately. For example, the write/read process can take place after a trigger event when the coating system next switches to automatic mode. Alternatively, it is possible that the partially painted painting module (e.g. fender of the motor vehicle body) is first finished on the component surface of the component to be coated and only then is the transponder read out. Alternatively, it is also possible for the currently partially painted component to be completely finished painted first, before the transponder is then written/read out.

Figure 1B:
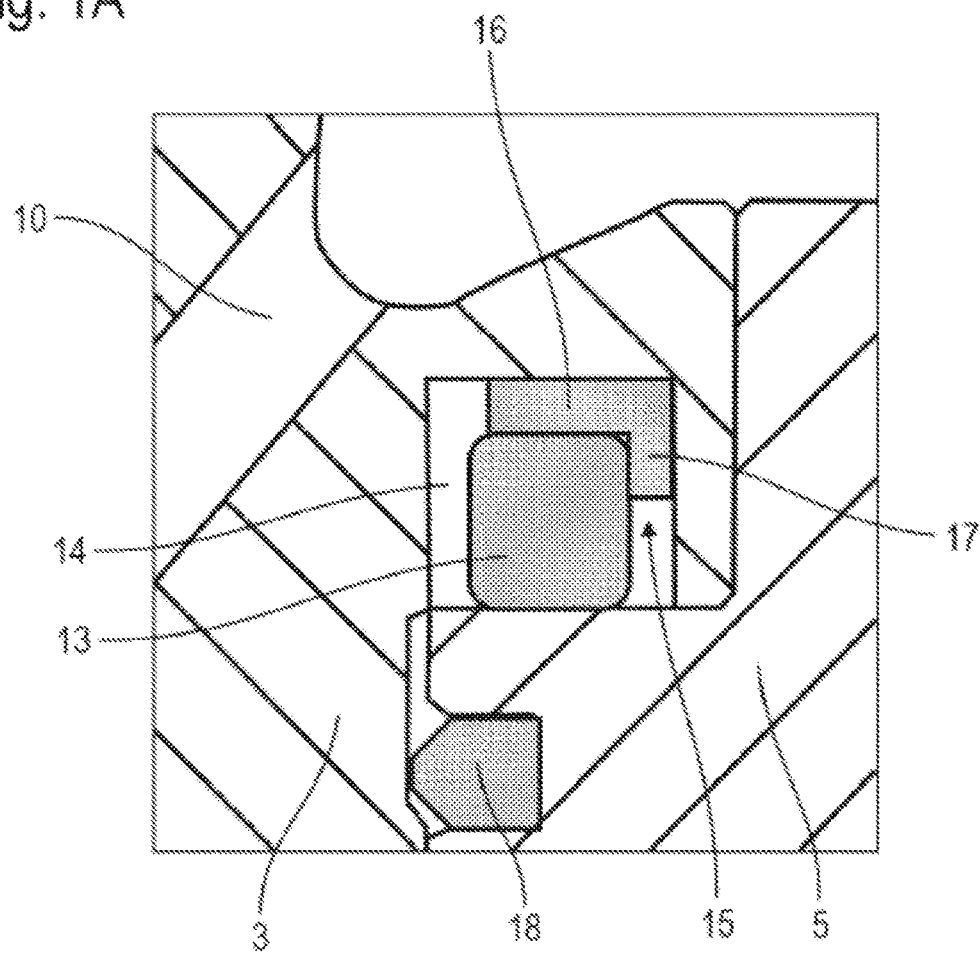

Other advantageous further embodiments of the disclosure are indicated in the dependent claims or are explained in more detail below together with the description of the preferred embodiments of the disclosure with reference to the figures. Showing:

FIGS. 1A and 1B show various views of a bell plate 1 according to the disclosure, which in operation is mounted on a rotary atomizer and rotates about an axis of rotation 2, as is known per se from the prior art.

The bell plate 1 essentially consists of a metallic base body 3, a distributor disc 4 and a distributor disc receptacle 5, the distributor disc 4 being fastened to the distributor disc receptacle 5 in a conventional manner by fastening bolts 6.

The base body 3 of the bell plate 1 has a central bore 7 which, on the one hand, contains the distributor disc receptacle 5 and, on the other hand, is used for the axial feedthrough of a paint nozzle, not shown here, which supplies the paint to be applied axially. The axially supplied paint then impinges on the distributor disc 4, which directs part of the paint radially outward onto an overflow surface 8 that leads to an annular spray-off edge 9. The paint is then sprayed off at the spray-off edge 9 in the conventional manner. In contrast, part of the paint supplied axially through the central bore 7 passes axially through a central bore in the distributor disc 4 and then flows radially outward at the front face of the distributor disc 4.

In addition, the bell plate 1 conventionally has external rinsing channels 10 which start from the central bore 7 in the bell plate 1 and open radially outwardly into an annularly circumferential external rinsing chamber 11, which is in itself known from the prior art. During a rinsing process, rinsing agent can thus pass through the external rinsing channels 10 into the external rinsing chamber 11, from where the rinsing agent then flows radially outwards onto the outer circumferential surface 12 of the bell plate in order to clean the latter.

The bell plate 1 according to the disclosure is characterized by the fact that a transponder 13 is integrated into the bell plate 1. For this purpose, the metallic base body 3 of the bell plate 1 has an annular groove 14 which runs coaxially with the axis of rotation 2 of the bell plate 1. The annular groove 14 is open at the end in the base body 3 so that the readout of the transponder 13 is not impeded by the metallic material of the base body 3. The transponder 13 can therefore be reliably read out from the face of the bell plate 1.

A washer 15 is inserted in the annular groove 14, which is essentially L-shaped in cross-section and has two legs 16, 17. The leg 16 of the washer 15 runs essentially radially and lies between the groove bottom of the annular groove 14 and the transponder 13, while the other leg 17 runs essentially axially and lies between the radially inner groove flank of the annular groove 14 and the transponder 13.

After the insertion of the washer 15 and the transponder 13 into the annular groove 14, the annular groove 14 is sealed with the washer 15 and the transponder 13 with a casting compound, whereby the casting compound is non-metallic in order not to hinder the reading of the transponder 13.

In the assembled state, the distributor disc receptacle 5 covers the annular groove 14 in a sealing manner, for which purpose a sealing ring 18 is provided, which is embedded in an annular groove in the outer lateral surface of the distributor disc receptacle 5 and rests against the base body 3. The distributor disc receptacle 5, together with the distributor disc 4, thus prevents the transponder 13 from being contaminated by coating agent.

It should be mentioned here that the distributor disc receptacle 5 and the distributor disc 4 are made of plastic and therefore do not impede the reading of the transponder 13, since they do not form an electromagnetic shield.

Figure 2A:
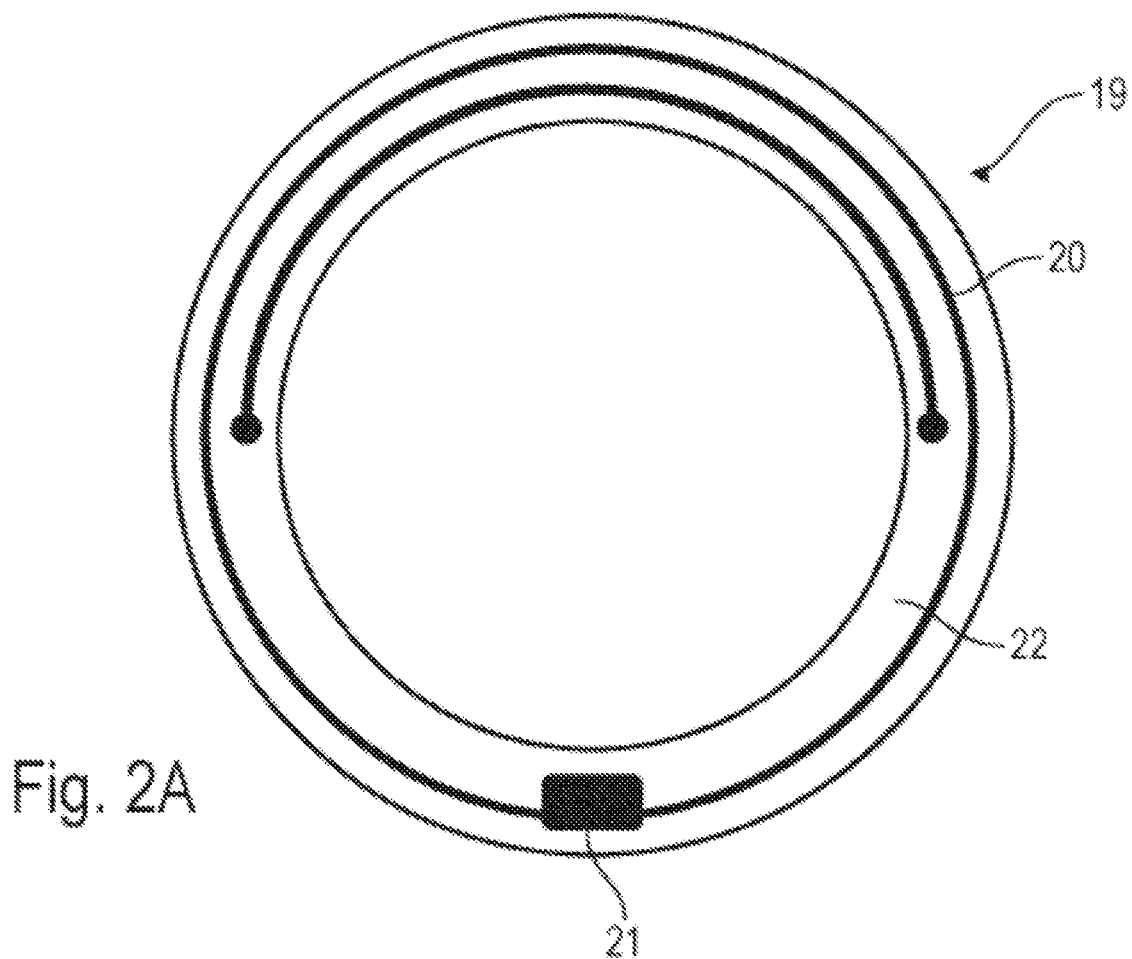
Figure 2B:
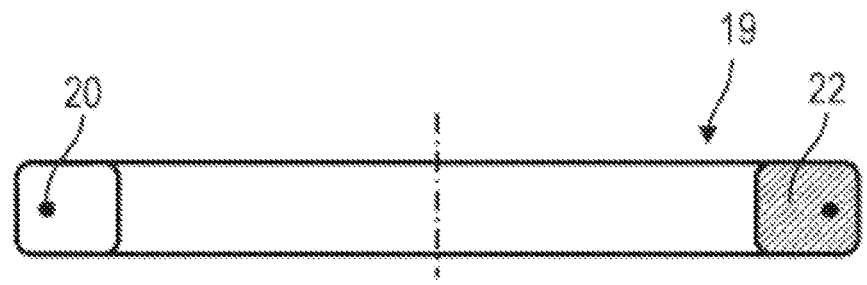

FIGS. 2A and 2B show an alternative embodiment of a transponder 19 having an antenna 20 and a chip 21, both of which are molded into a plastic ring 22. In this case, the plastic ring 22 may be made in two parts, one part of the plastic ring 22 being the distributor disc receptacle 5. The antenna 20 may be molded in one part of the plastic ring 22 or the distributor disc receptacle 5. The chip 21 may be molded into the second portion of the plastic ring 22, wherein the second portion of the plastic ring 22 may be the washer 15. The plastic ring 22 or the washer 15, which contains the chip 21, may be balanced with respect to its axis of symmetry, so that after insertion of the chip 21 on the base body 3 of the bell plate 1, it is balanced and pressed in in an arranged manner. The ring-shaped transponder 19 is balanced with respect to its axis of symmetry, so that after insertion of the transponder 19 into the correspondingly suitable bell plate 1, no renewed balancing of the bell plate 1 is necessary.

If the bell plate 1 loses the distributor disc receptacle 5 due to a defect, the read/write range of the chip 21 is reduced to 10 mm. The reduced range can be detected by the low received signal strength (RSSI: Received Signal Strength Indication). Thus, it can be detected that the distributor disc 4 is defective and the bell plate 1 is no longer complete.

Figure 3:
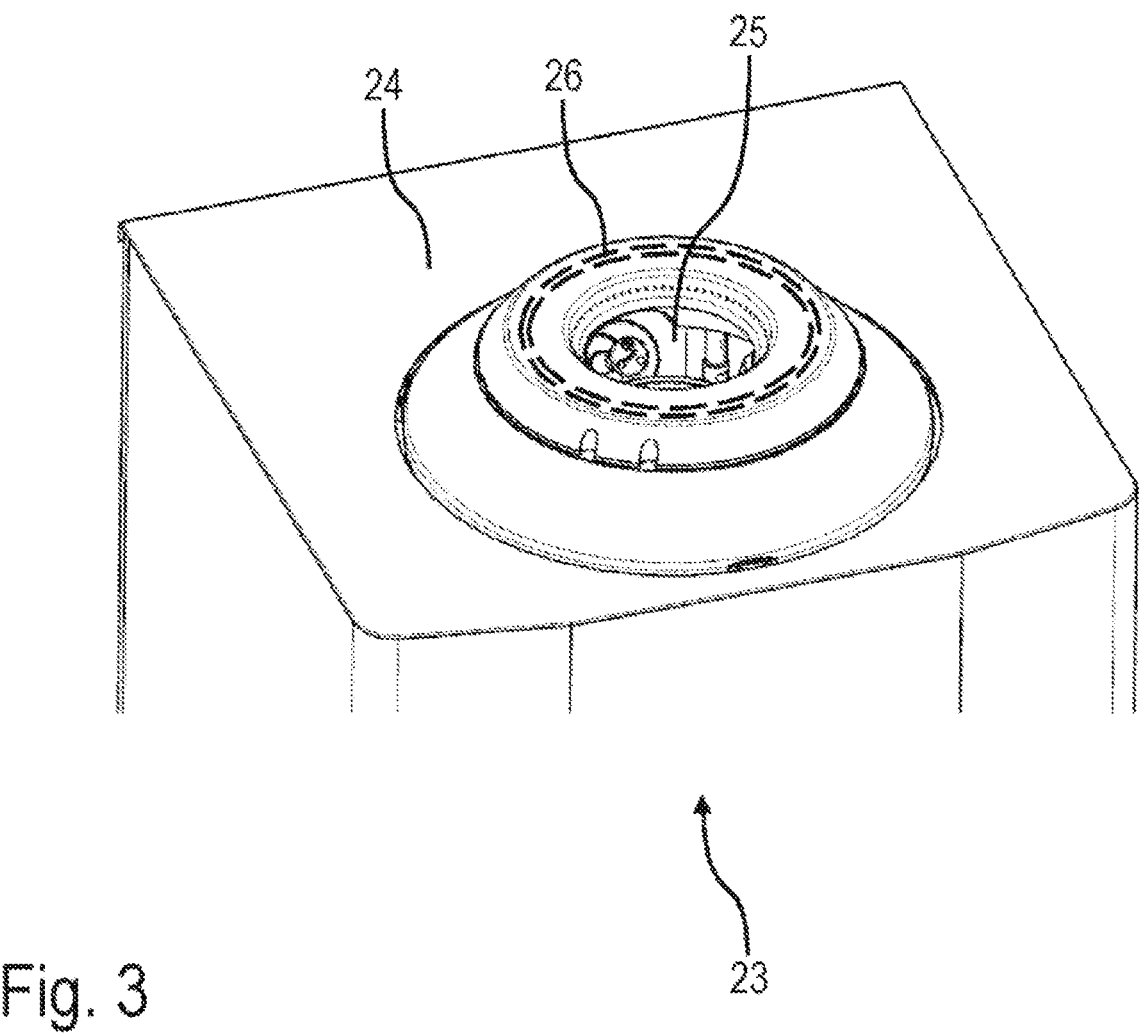

FIG. 3 shows a perspective view of an atomizer cleaning device 23 according to the disclosure, which is particularly adapted to read the transponder 13 of the bell plate 1 according to FIGS. 1A and 1B.

The atomizer cleaning device 23 first has, in a conventional manner, a cover 24 with an insertion opening 25, wherein the rotary atomizer to be cleaned can be inserted into the atomizer cleaning device 23 through the insertion opening 25, which is known per se from the prior art.

In this case, the insertion opening 25 is bypassed by an antenna 26 of a transponder reader, the antenna 26 being annular and capable of generating a rotating detection field.

Figure 4:
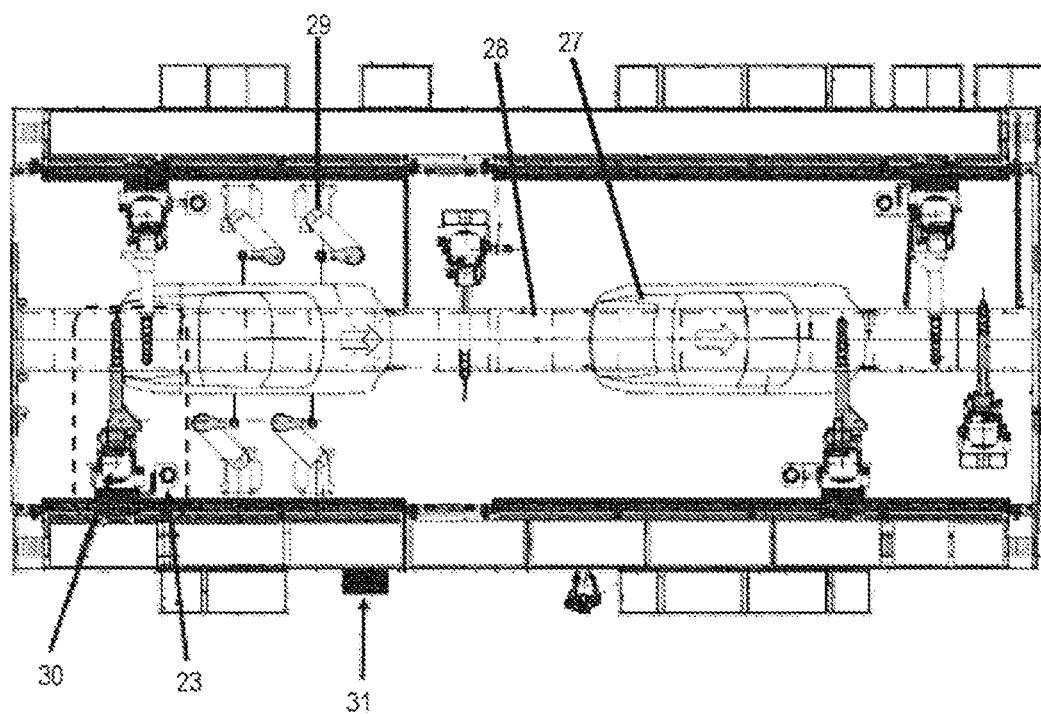

FIG. 4 shows a top view of a painting installation according to the disclosure. Here, motor vehicle bodies 27 are conveyed through the painting installation by a linear conveyor 28, which is in itself known from the prior art.

Handling robots 29 (door openers and hood openers) are arranged on both sides of the linear conveyor 28 in order to open doors and hoods of the motor vehicle bodies 27 for interior painting.

In addition, painting robots 30 are located on both sides of the linear conveyor 28 for painting the motor vehicle bodies 27 by rotary atomizers. Next to each of the painting robots 30 is the atomizer cleaning unit 23 with the integrated antenna 26 for reading the transponder 13. The antenna 26 of the atomizer cleaning unit 23 is connected to a transponder reader 31, which is arranged outside the painting booth.

Figure 5:
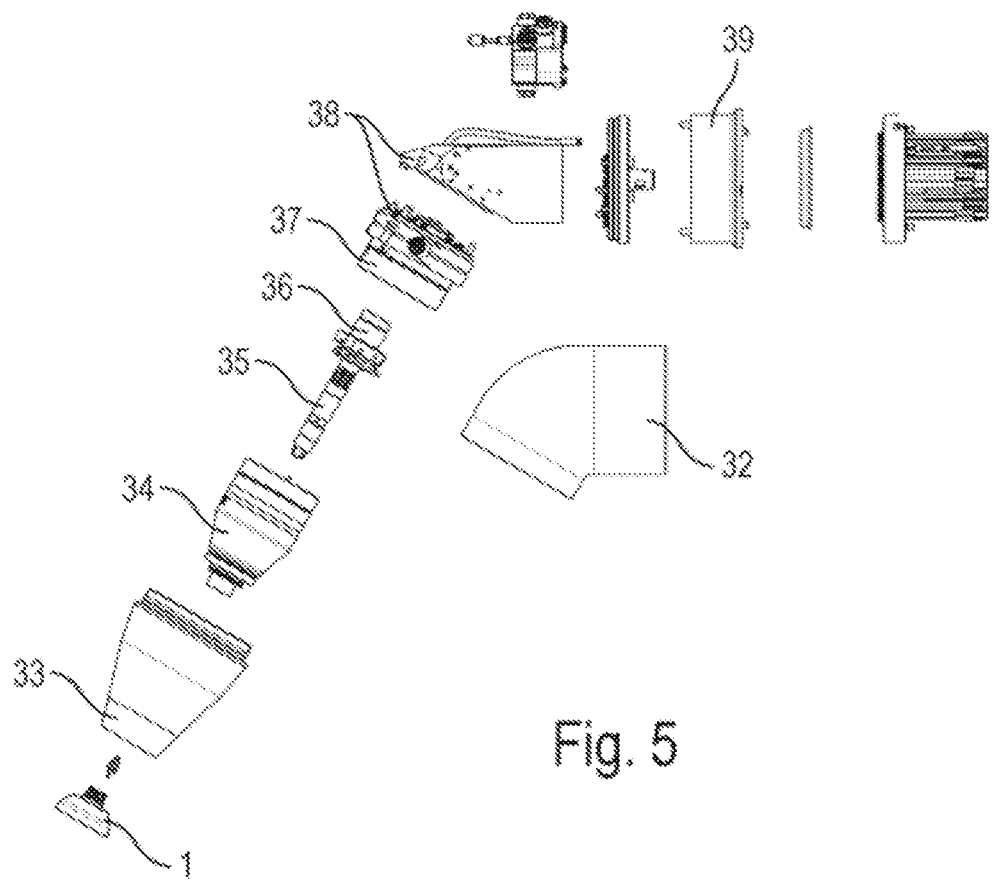

FIG. 5 shows an exploded view of a rotary atomizer according to the disclosure with the bell plate 1 and numerous other components which are also provided with their own transponder, namely a housing 32, a shaping air ring 33, a turbine 34, a paint tube 35, a main needle valve 36, valves 37, valve blocks 38 and a connecting flange 39.

Figure 6:
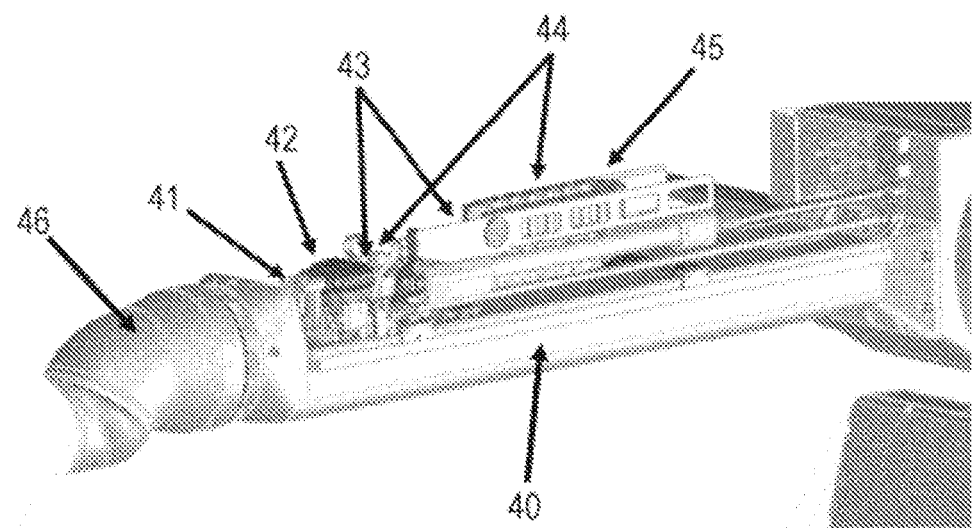

FIG. 6 shows a distal robot arm 40 of a painting robot, whereby the robot arm 40 is also referred to as "arm 2" in accordance with the usual technical terminology. The robot arm 40 carries various components, namely a paint pressure controller 41, a metering pump 42, valve blocks 43, valves 44, a paint changer 45 and a robot hand axis 46. All or some of these components may also be provided with transponders.

Figure 7:
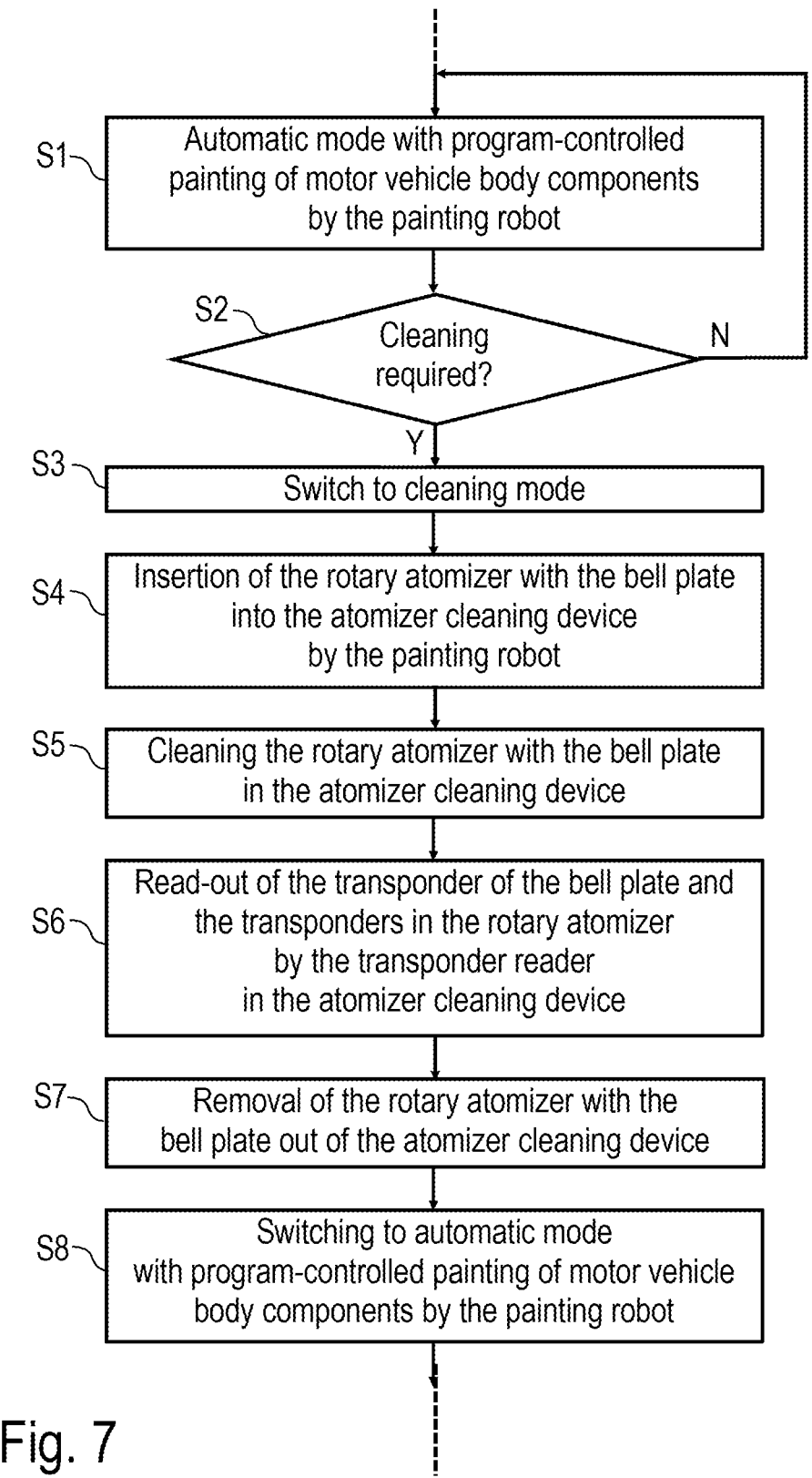

The example shown in FIG. 7 will now be explained.

In step S1, the painting installation is operated in automatic mode with program-controlled painting of motor vehicle body components.

In step S2, the system then checks whether cleaning is required.

If no cleaning is required, the painting installation continues with the automatic mode in step S1.

If, on the other hand, cleaning is required, the system switches from automatic mode to cleaning mode in step S3.

In step S4, the rotary atomizer is then inserted into the atomizer cleaning device and then cleaned in step S5.

When the rotary atomizer is inserted or pulled out, the transponder of the bell plate can then be read in the step S6.

As in a normal cleaning process, the rotary atomizer is then removed from the atomizer cleaning device again in step S7.

Finally, in a step S8, it can then be switched back to automatic mode.

The transponder is thus read out as part of a normal cleaning process, so that no extension of the cycle time of the painting installation is required for this purpose.

Figure 8:
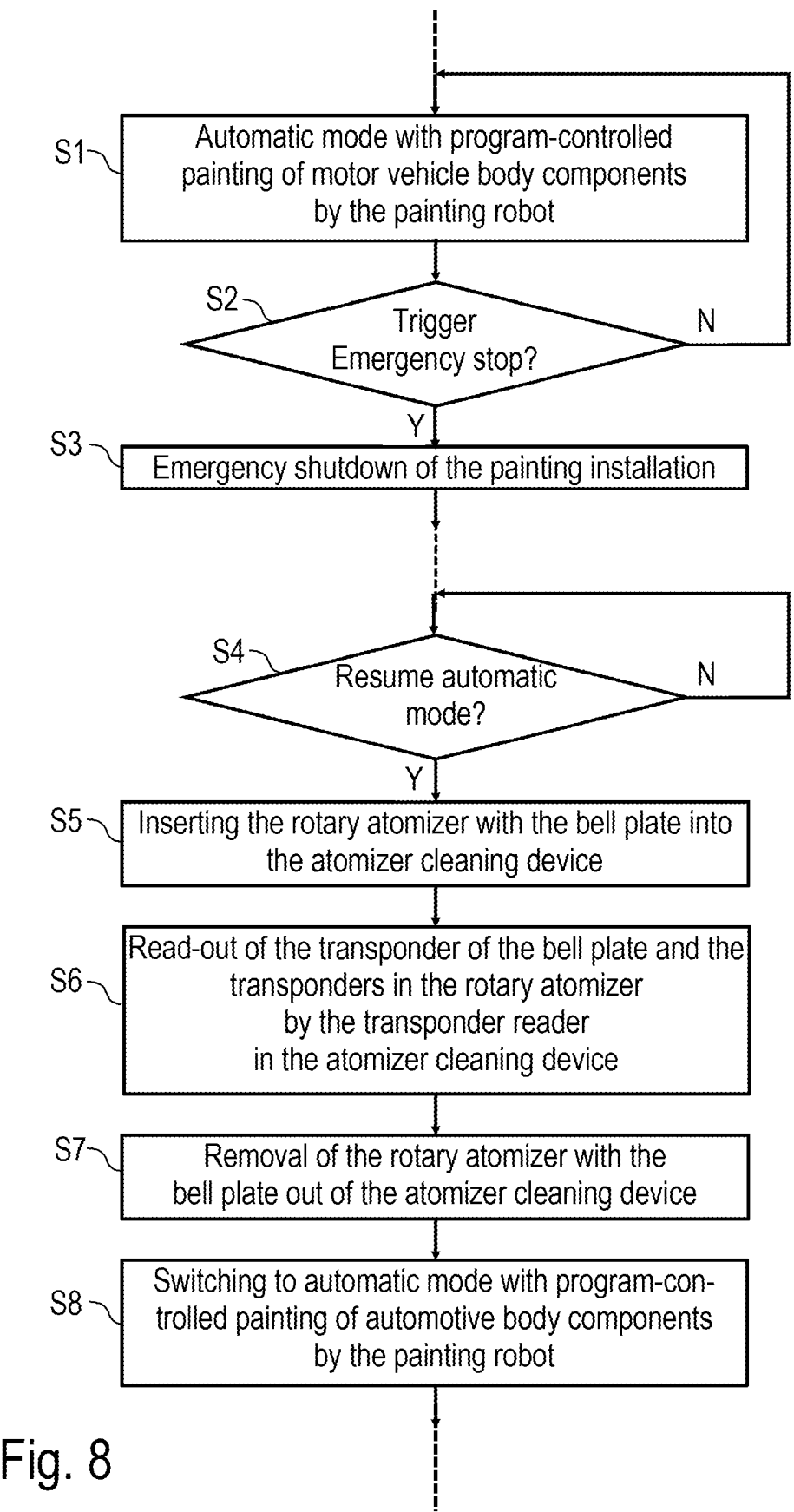

The example shown in FIG. 8 is described below.

In a step S1, the painting installation is operated in automatic mode, in which motor vehicle body components are painted automatically by a painting robot under program control.

In a step S2, the system then continuously checks whether an emergency stop is triggered, for example by manually actuating an emergency stop switch.

If no emergency stop is triggered, the painting installation continues in automatic mode according to step S1.

If, on the other hand, an emergency stop is triggered, the coating system is switched off in step S3.

Then, in step S4, it is checked whether the automatic mode is resumed.

If this is the case, the rotary atomizer is inserted into the atomizer cleaning device in step S5 and the transponder of the bell plate is read out in step S6.

Subsequently, in step S7, the rotary atomizer is then led out of the atomizer cleaning device again, and in step S8, automatic mode is resumed.

Figure 9:
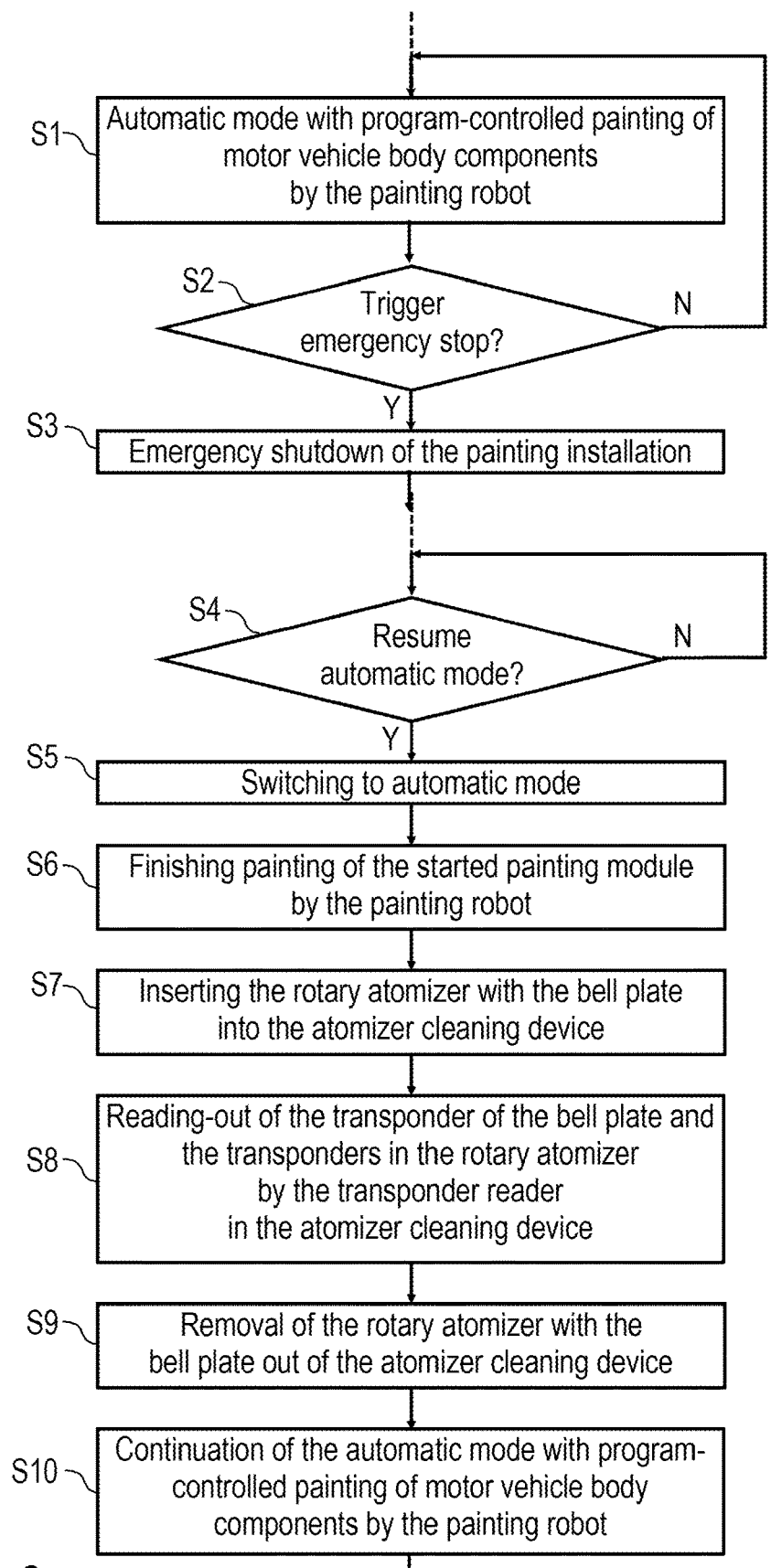

The embodiment according to FIG. 9 largely corresponds to the embodiment according to FIG. 8, so that reference is made to the above description in order to avoid repetition.

A special feature of this embodiment is that after resumption of automatic mode, the already partially painted painting module (e.g. fender) is first finished in a step S6.

Only then does the transponder readout follow in steps S7-S9.

Figure 10:
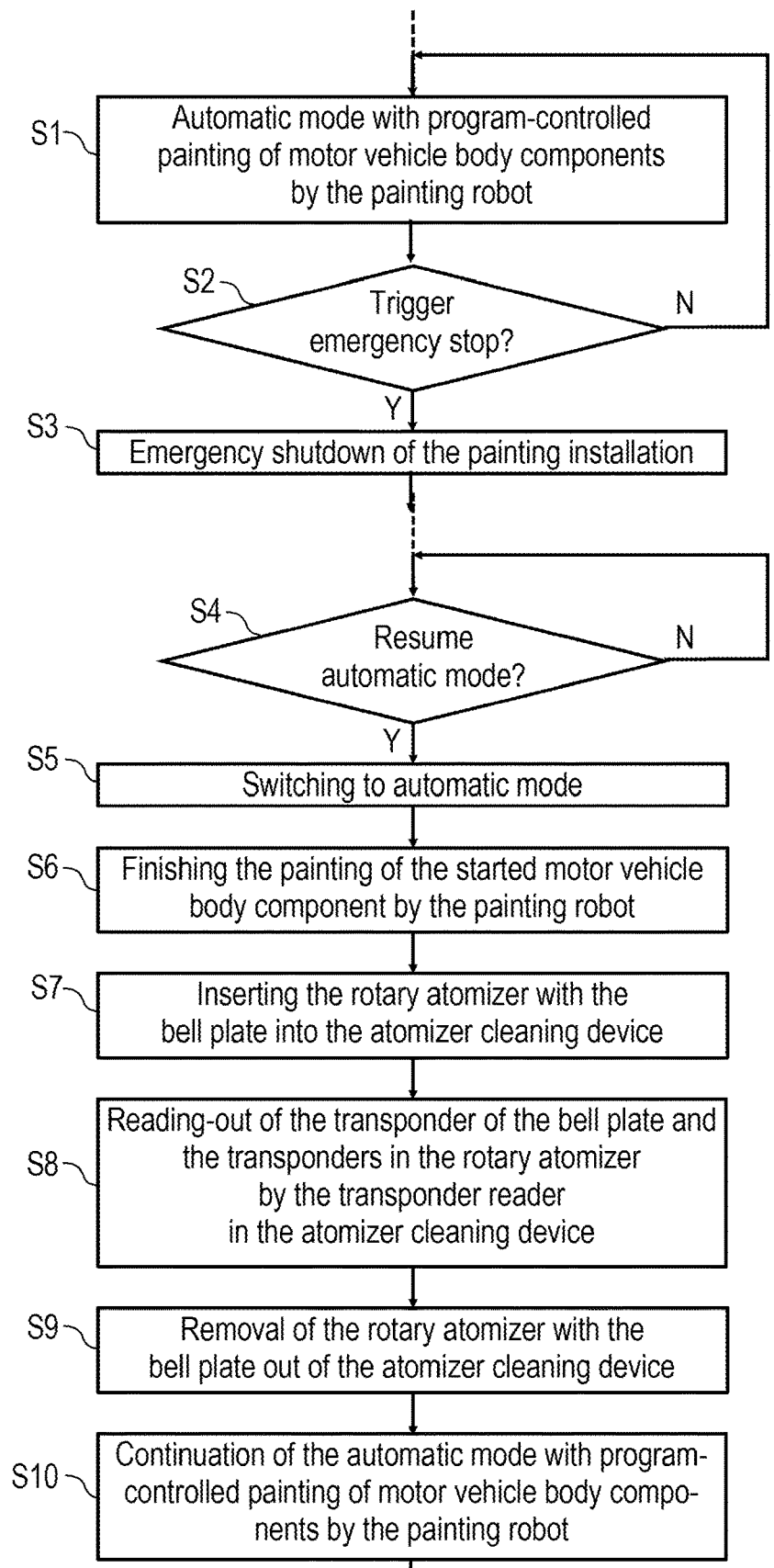

The embodiment according to FIG. 10 also largely corresponds to the embodiment according to FIGS. 8 and 9, so that reference is made to the above description in order to avoid repetition.

A special feature of this embodiment is that after resumption of the automatic mode, the complete started motor vehicle body is first finished being painted before the transponder is then read out in steps S7-S9.

Figure 11:
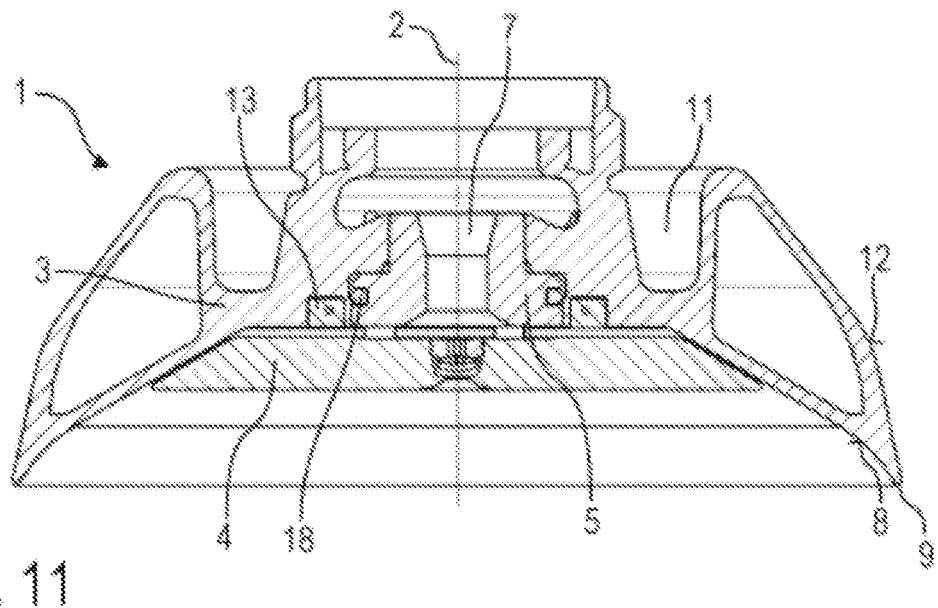

FIG. 11 shows a further embodiment of a bell plate 1 according to the disclosure, which largely corresponds to the bell plate 1 according to FIG. 1A, so that to avoid repetition reference is made to the above description, the same reference signs being used for corresponding details as in FIG. 1A.

A feature of this embodiment is that the transponder 13 is here covered only by the distributor disc 4, but not by the distributor disc receptacle 5. The transponder 13 is here namely located radially outside the distributor disc receptacle 5. The distributor disc receptacle 5 can therefore in this embodiment also be made of a metallic material, since the distributor disc receptacle 5 does not here shield the transponder 13.

It should also be mentioned that the annular groove 14 for receiving the transponder 13 is located in an area of the overflow surface 8 that is aligned at right angles to the axis of rotation 2.

A further feature of this embodiment is that the outer circumferential surface 12 of the bell plate 1 is divided here into two sections which follow one another in the axial direction and enclose different angles to the axis of rotation 2.

Figure 12:
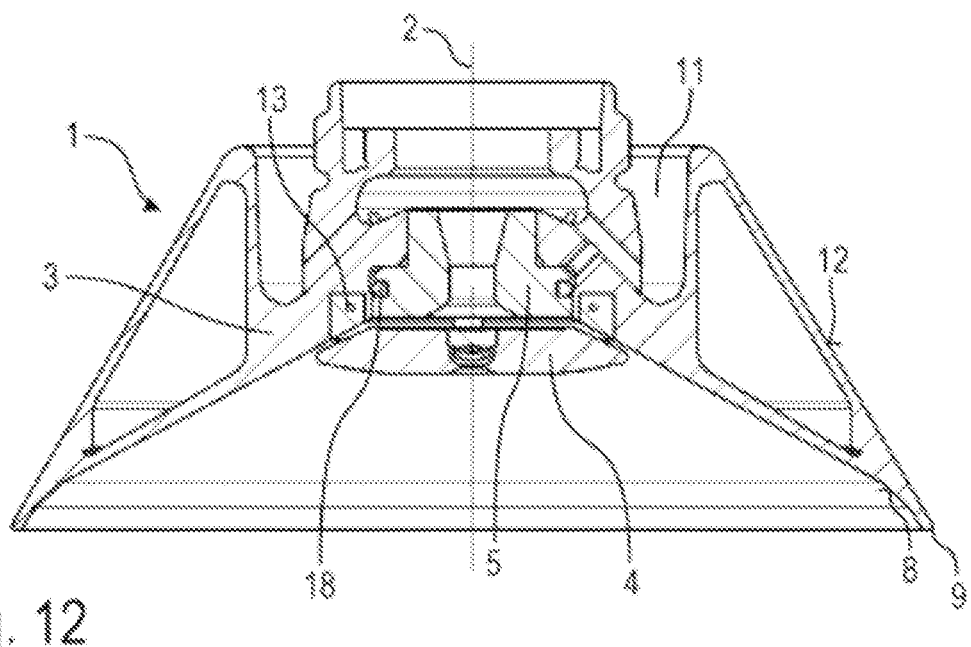

FIG. 12 shows a further embodiment of a bell plate 1 according to the disclosure, which largely corresponds to the bell plate 1 according to FIG. 11, so that in order to avoid repetition reference is made to the above description, the same reference signs being used for corresponding details as in FIG. 11.

A feature of this embodiment is that the annular groove 14 for receiving the transponder 13 is located here in an obliquely extending region of the overflow surface 8.

Figure 13:
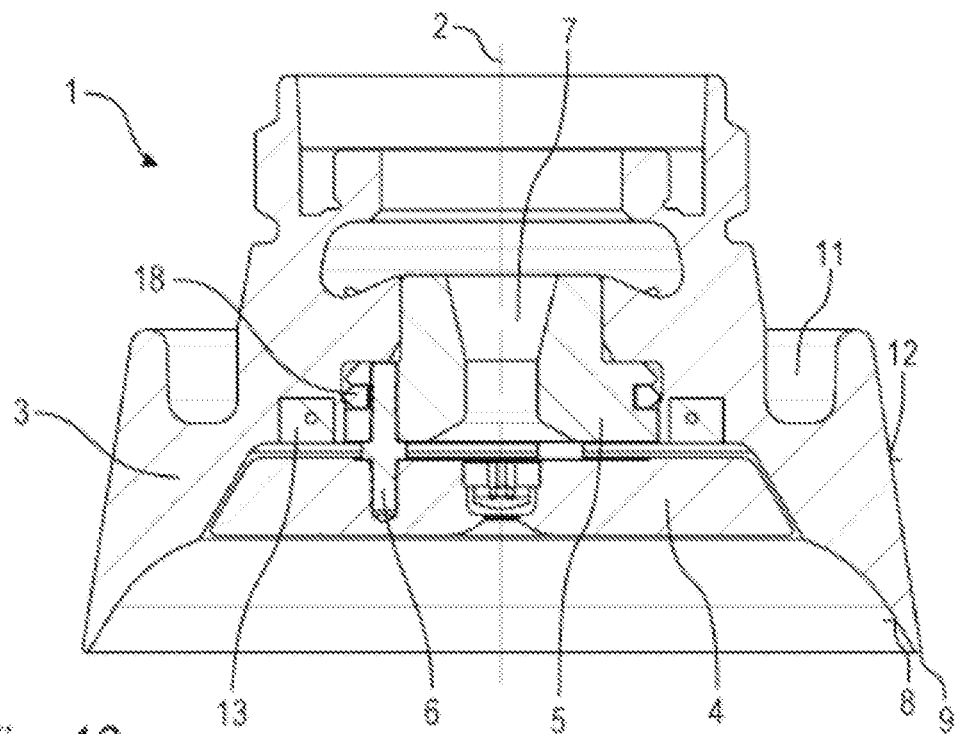

FIG. 13 shows a further embodiment of a bell plate 1 according to the disclosure, which largely corresponds to the bell plate 1 according to FIG. 11, so that to avoid repetition reference is made to the above description, the same reference signs being used for corresponding details as in FIG. 11.

A feature of this embodiment is that the outer circumferential surface 12 of the bell plate 1 here encloses a substantially smaller angle with the axis of rotation 2 of the bell plate 1.

Figure 14:
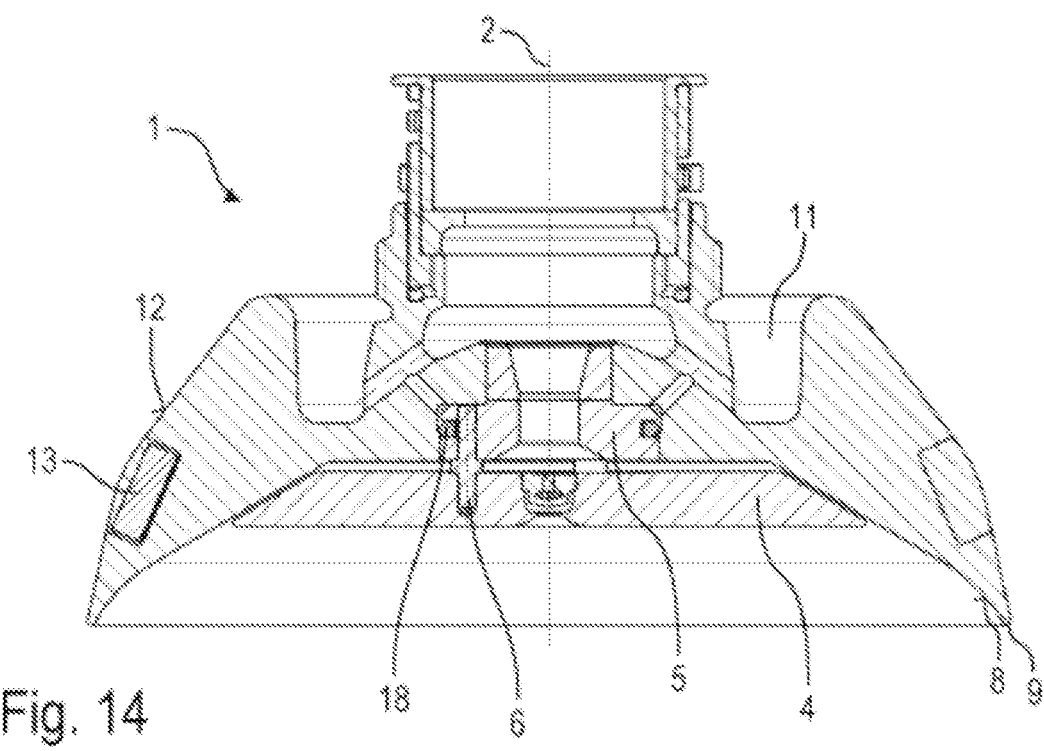

FIG. 14 shows a further embodiment of a bell plate 1 according to the disclosure, which largely corresponds to the bell plate 1 according to FIG. 13, so that in order to avoid repetition reference is made to the above description, the same reference signs being used for corresponding details as in FIG. 13.

A feature of this embodiment is that the transponder 13 is recessed here in the outer circumferential surface 12 of the base body 3 of the bell plate 1.

Figure 15:
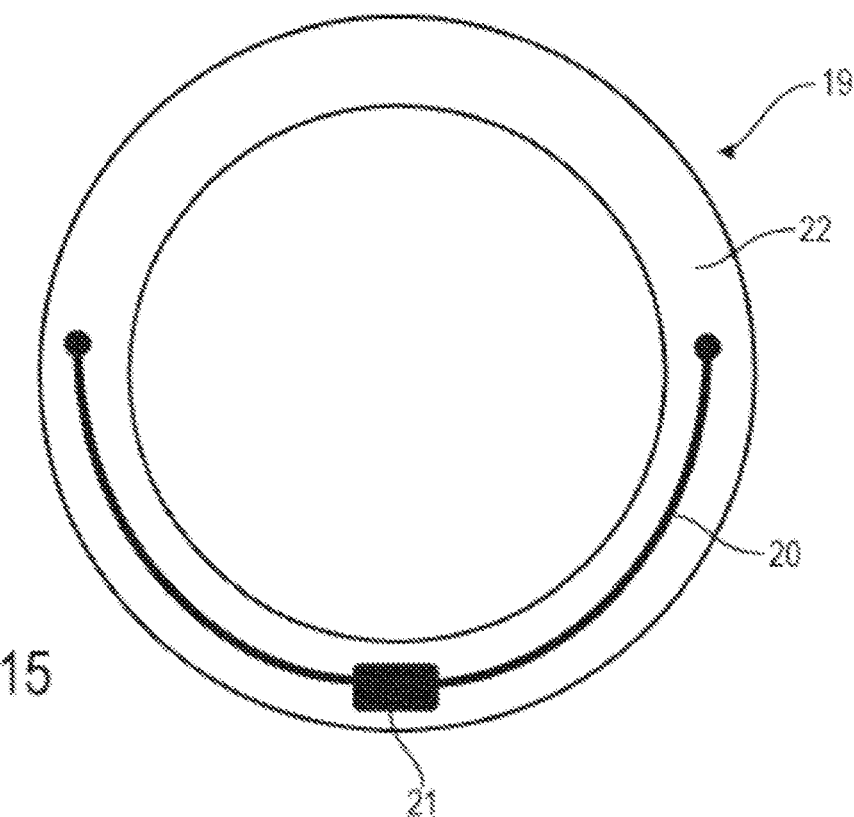

FIG. 15 shows a further embodiment of a transponder 19 according to the disclosure, where this embodiment largely corresponds to the embodiment according to FIG. 2A, so that to avoid repetition reference is made to the above description of FIG. 2A, the same reference signs being used for corresponding details.

A feature of this embodiment is that the antenna 20 of the transponder 19 is not closed in a ring, but is formed as a dipole with two legs.

Figure 16:
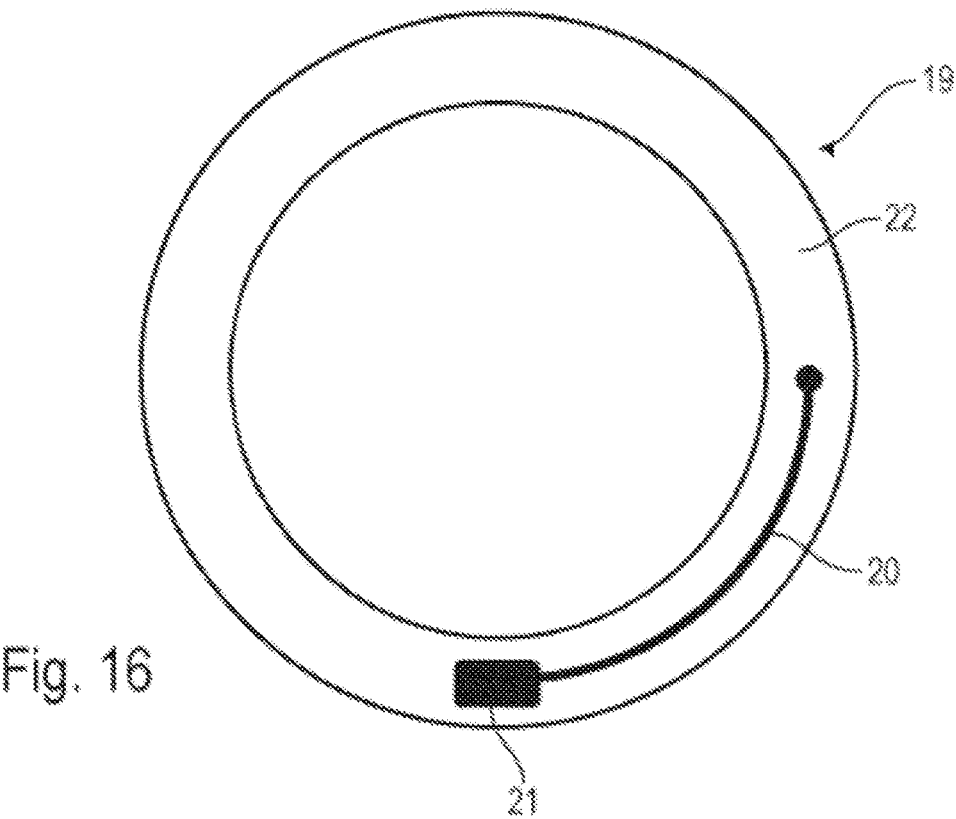

FIG. 16 shows a further embodiment of a transponder 19 according to the disclosure, where this embodiment largely corresponds to the embodiment according to FIG. 2A, so that to avoid repetition reference is made to the above description of FIG. 2A, the same reference signs being used for corresponding details.

A feature of this embodiment is that the antenna 20 is not closed in a ring shape, but is designed as a dipole with a limb.

Figure 17:
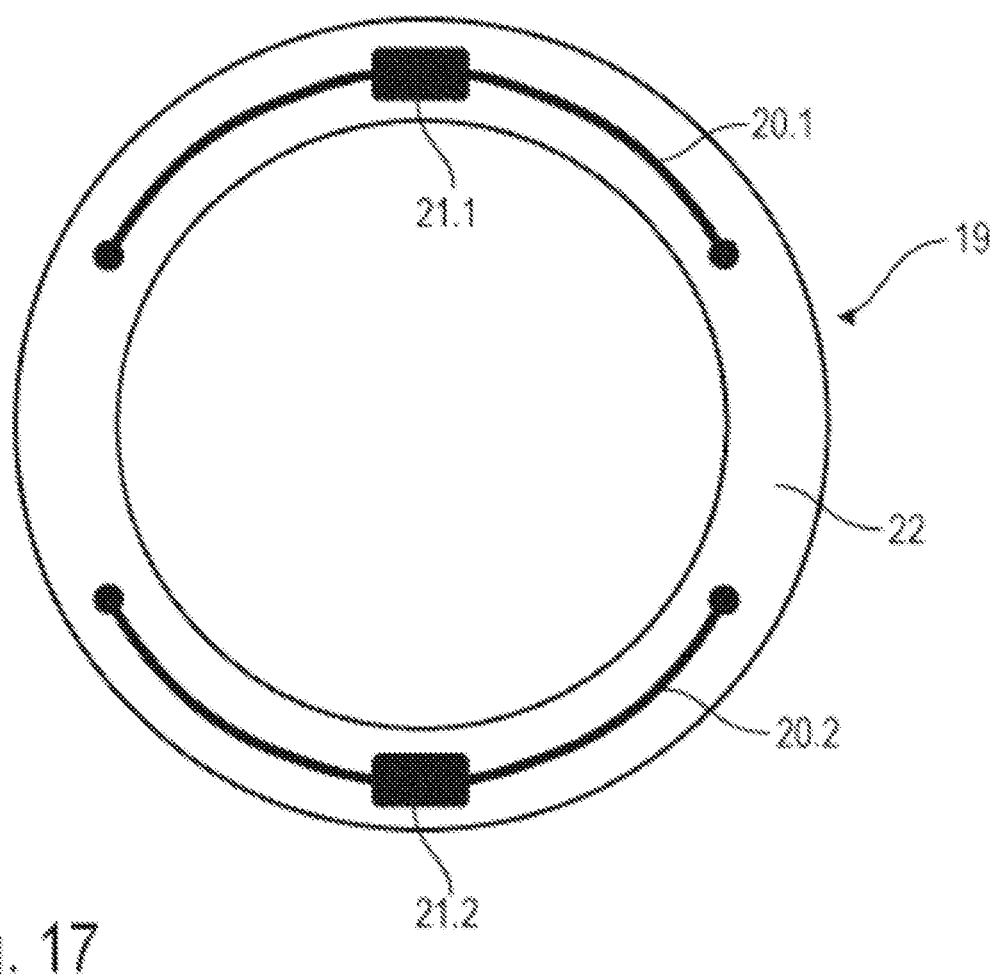

FIG. 17 shows a further embodiment of a transponder 19 according to the disclosure, where this embodiment largely corresponds to the embodiment according to FIG. 2A, so that reference is made to the above description of FIG. 2A in order to avoid repetitions, whereby the same reference signs are used for corresponding details.

A feature of this embodiment is that here two chips 21.1, 21.2 are embedded in the plastic ring 20 of the transponder 19, each of which has an antenna 20.1, 20.2. The two antennas 20.1, 20.2 are designed as dipoles with two legs each, as shown in FIG. 14.

Furthermore, it should be mentioned that the two chips 21.1, 21.2 can have different frequency ranges. For example, chip 21.1 may operate in the ultra-high-frequency (UHF) range (i.e., in the frequency range 300 MHz-3 GHz, preferably 860-920 MHz), while the other chip 21.2 operates in the near field communication (NFC) frequency range (e.g., at 13.56 MHz).

The disclosure is not limited to the preferred embodiments described above. Rather, a multitude of variants and variations are possible, which also make use of the inventive idea and therefore fall within the scope of protection. In particular, the disclosure also claims protection for the subject matter and the features of the dependent claims independently of the claims referenced in each case. Thus, the features of the dependent claims also enjoy independent protection independently of the features of the independent claims. Thus, the disclosure comprises various aspects of the disclosure, each of which is individually eligible for protection.

The invention claimed is:

1. A bell plate for a rotary atomizer for applying a coating agent, having
    a) a base body, and
    b) a transponder which can be read out wirelessly and is integrated in the bell plate, c) wherein the transponder is arranged on a front side of the base body of the bell plate,
d) wherein an annular space is arranged in the base body of the bell plate on a front side, the annular space running radially outside a distributor disc receptacle,
e) wherein the transponder is arranged in the annular space,
f) wherein the transponder has an antenna which is arranged in the annular space of the bell plate, and
g) wherein the antenna is designed:
  g1) as a closed ring,
  g2) as a dipole with one or two legs,
  g3) with several circular segments,
  g4) rectilinear or
  g5) meander-shaped.

2. The bell plate according to claim 1, wherein the base body is made of metal.

3. The bell plate according to claim 2, further comprising:
a) an axially extending central bore in the base body for the passage of a paint nozzle for the axial supply of the coating agent to be applied,
b) an annular spray-off edge on the base body for spraying off the atomized coating agent from the spray-off edge,
c) a frontal overflow surface on the base body extending outwardly from the central bore to the spray-off edge,
d) a distributor disc which deflects the axially and centrally supplied coating agent at least partially radially outwardly onto the overflow surface and to the spray-off edge, and
e) a distributor disc receptacle mounted in the base body, the distributor disc being mounted on the distributor disc receptacle.

4. The bell plate according to claim 3, wherein
a) at least one of the distributor disc and the distributor disc receptacle covers the transponder on the front side in order to protect the transponder from contamination by the coating agent, and
b) at least one of the distributor disc and the distributor disc receptacle is made of plastic so as not to electromagnetically shield the transponder.

5. The bell plate according to claim 3, wherein the transponder is arranged radially outside the distributor disc receptacle.

6. The bell plate according to claim 3, wherein
a) the distributor disc receptacle closes off the annular groove, which is open at the front side, in a sealing manner at the front side, and
b) a sealing ring is provided for sealing the annular groove, and
c) that the sealing ring is arranged in an annular sealing groove in the distributor disc receptacle and bears in a sealing manner against the base body of the bell plate.

7. The bell plate according to claim 1, wherein the antenna is adapted to operate inductively.

8. The bell plate according to claim 1, wherein the antenna is adapted to operate with electromagnetic waves.

9. The bell plate according to claim 1, wherein the transponder has two different communication frequencies for wireless data transmission.

10. The bell plate according to claim 1, wherein
a) the annular antenna is inserted into an annular groove in the bell plate,
b) a washer is inserted into the annular groove in the bell plate, which washer is located at least partially between the groove bottom of the annular groove and the transponder,
c) the transponder is cast with the washer in the annular groove with a casting compound,
d) the casting compound is non-metallic so as not to shield the transponder.

11. The bell plate according to claim 10, wherein the washer is substantially L-shaped in cross-section, while a first radial leg of the washer is located between the transponder and the groove bottom of the annular groove, while a second axial leg of the washer is located between the transponder and a radially inner groove flank of the annular groove.

12. The bell plate according to claim 1, wherein
a) an annular groove runs coaxially with the axis of rotation of the bell plate, and
b) the annular groove is annular, and
c) the annular groove is open towards the front side of the bell plate.

13. The bell plate according to claim 1, wherein the transponder is an active transponder with its own power supply or a passive transponder without its own power supply.

14. The bell plate according to claim 1, wherein the transponder is an RFID transponder which outputs an identification code when interrogated, and the transponder contains a readable identification code which identifies the bell plate.

15. The bell plate according to claim 1, wherein the transponder has a write memory.

16. A bell plate for a rotary atomizer for applying a coating agent, having
a) a base body,
b) an annular space is arranged in the base body of the bell plate on the front side, the annular space running radially outside a distributor disc receptacle, and
c) a transponder which can be read out wirelessly and is integrated in the bell plate,
d) wherein the transponder is arranged in the base body on the front side of the bell plate in the annular space,
e) wherein the transponder has an antenna which is arranged in the annular space of the bell plate,
f) wherein the transponder with the annular antenna is embedded in a plastic ring, and
g) the plastic ring is arranged in the annular space of the bell plate.

17. The bell plate according to claim 16, wherein
a) the plastic ring is balanced with respect to its axis of symmetry, and
b) the axis of symmetry of the plastic ring runs coaxially with the axis of rotation of the bell plate.

18. The bell plate according to claim 16, wherein
a) the plastic ring consists of two parts,
b) the antenna and an IC chip are each arranged in one of the two parts of the plastic ring,
c) the IC chip is arranged on the front side in the base body of the bell plate,
d) one of the parts of the plastic ring is pressed into a washer, and
e) the part of the plastic ring with the embedded antenna is pressed into an annular receptacle in the distributor disc receptacle.

19. A bell plate for a rotary atomizer for applying a coating agent, having
a) a base body, and
b) a transponder which can be read out wirelessly and is integrated in the bell plate, c) wherein the transponder is arranged in the base body on the front side or is embedded into the outer circumferential surface of the bell plate,
d) wherein the transponder contains at least two IC chips, with the individual IC chips each have an antenna and contain independent information, and
e) additionally at least one further antenna is embedded in a distributor disc, which is coupled to the antenna of the transponder.

* * * * *